United States Patent
Masiewicz

(10) Patent No.: US 7,647,544 B1
(45) Date of Patent: Jan. 12, 2010

(54) DISK DRIVE IMPLEMENTING DATA PATH PROTECTION WITHOUT WRITING THE ERROR DETECTION CODE DATA TO THE DISK

(75) Inventor: John C. Masiewicz, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 792 days.

(21) Appl. No.: 11/284,450

(22) Filed: Nov. 22, 2005

(51) Int. Cl.
*G11C 29/00* (2006.01)
*H03M 13/00* (2006.01)
*G11B 5/02* (2006.01)

(52) U.S. Cl. .......................... 714/770; 714/758; 360/53

(58) Field of Classification Search ........................ None
See application file for complete search history.

(56) References Cited

U.S. PATENT DOCUMENTS

| | | | |
|---|---|---|---|
| 5,613,066 A | 3/1997 | Matsushima et al. | |
| 6,092,231 A | 7/2000 | Sze | |
| 6,279,135 B1 * | 8/2001 | Nguyen et al. | 714/769 |
| 6,324,604 B1 | 11/2001 | Don et al. | |
| 6,751,757 B2 | 6/2004 | Biskup et al. | |
| 6,766,491 B2 * | 7/2004 | Busser | 714/770 |
| 2004/0019718 A1 | 1/2004 | Schauer et al. | |
| 2004/0243912 A1 * | 12/2004 | Larsen et al. | 714/770 |
| 2005/0086421 A1 | 4/2005 | Nassar | |

* cited by examiner

*Primary Examiner*—Christine T Tu
(74) *Attorney, Agent, or Firm*—Howard H. Sheerin, Esq.

(57) ABSTRACT

A disk drive is disclosed comprising a disk, a buffer memory, and control circuitry operable to receive a write command from a host, wherein the write command comprises write data and a write data address. Write EDC data is generated in response to the write data and the write data address, wherein the write data and the write EDC data are stored in the buffer memory. The write data is read from the buffer memory, and write check data is generated in response to the write data and the write data address. The write EDC data is read from the buffer memory and compared to the write check data to detect a write error. If the write error is not detected, the write data is written to the disk without writing the write EDC data to the disk.

22 Claims, 6 Drawing Sheets

DISK DRIVE IMPLEMENTING DATA PATH PROTECTION WITHOUT WRITING THE ERROR DETECTION CODE DATA TO THE DISK

BACKGROUND OF THE INVENTION

1. Field of the Invention

The present invention relates to disk drives for computer systems. More particularly, the present invention relates to a disk drive implementing data path protection without writing the error detection code (EDC) data to the disk.

2. Description of the Prior Art

Disk drives typically employ a number of interacting components that coordinate the transfer of data from a host during write operations, and the transfer of data read from the disk to the host during read operations. FIG. 1 shows an example of a prior art disk drive comprising one or more disks 2 and corresponding heads 3 enclosed in a head disk assembly (HDA) 4. The disk comprises a number of concentric, radially spaced data tracks, wherein each data track comprises a number of data sectors. A voice coil motor (VCM) 6 actuates the heads 3 over the disks 2 to access a target data sector within a target data track during write and read operations. A printed circuit board (PCB) is mounted to the HDA 4, wherein one or more integrated circuits for controlling operation of the disk drive are mounted on the PCB, including a microprocessor (uP) 8 for executing code segments of a control program. The microprocessor 8 typically accesses a fast uP cache 10 (e.g., an SRAM) through a uP cache controller 11 which caches op codes being executed as well as program data.

The code segments of the control program are typically stored on the disk 2 and loaded into an external buffer memory 12 (e.g., an SDRAM) when the disk drive is powered on. As the microprocessor 8 executes the control program, the uP cache controller 11 transfers a burst of corresponding op codes from the external buffer memory 12 into the uP cache 10 for fast access by the microprocessor 8. Since the buffer memory 12 is typically shared with other control components, a buffer controller 14 implements an arbitration algorithm to arbitrate access to the buffer memory 12. Example control components that may share access to the buffer memory 12 include a host interface 16, a disk interface 18, a data cache controller 20, and an ECC controller 22, one or more of which may be integrated with the microprocessor 8 in a system on a chip (SOC), or implemented as separate integrated circuits.

The host interface 16 facilitates data transfer between the disk drive and a host 24 during read and write operations. That is, during write operations the host interface 16 stages the data received from the host 24 in the buffer memory 12 before it is written to the disk 2, and during read operations data read from the disk 2 is staged in the buffer memory 12 before the host interface 16 transmits the read data to the host 24. The disk interface 18 performs the actual interface functions with the HDA 4 in order to write data stored in the buffer memory 12 to the disk 2, and store data into the buffer memory 12 that is read from the disk 2. The data cache controller 20 accesses a data cache area of the buffer memory 12 in order to implement a suitable caching algorithm, and the ECC controller 22 implements a suitable error correction algorithm on data read from the disk 4 and stored in the buffer memory 12.

The ever increasing complexity of the control program executed by the microprocessor 8 to coordinate the numerous components of the disk drive increases the probability of a programming error resulting in bad data being transferred to the host 24 during read operations or written to the disk 2 during write operations. Defects in the integrated storage elements of the buffer memory 12 may also induce errors in the read data transferred to the host 24. To help protect against transferring bad data to the host 24, prior art disk drives have implemented "data path protection" techniques wherein the logical block address (LBA) received from the host 24 during a write operation is used by the host interface 16 to encode error detection code (EDC) data that are appended to the corresponding data sector written to the disk 2. Alternatively, the host 24 may use the LBA to encode the EDC data which is transmitted to the disk drive together with the user data for the write command. During a read operation of the data sector, check data is generated using the LBA received from the host 24 to verify the integrity of the read data as it is transferred to the host 24, and/or the host 24 may generate check data using the LBA to verify the integrity of the read data once received. If the check data does not match the EDC data appended to the data sector, an error condition is triggered.

In order to implement data path protection in a disk drive, the size of the data sectors is typically increased to accommodate the appended EDC data. However, increasing the size of the data sectors requires significant modifications to the control program executed by the microprocessor 8 as well as significant modifications to the various other components shown in FIG. 1. For example, if a conventional disk drive employs 512 byte data sectors and the EDC data comprise an additional 4 bytes, then the control program and control components must be modified to accommodate a 516 byte data sector. The modifications required to increase the size of the data sectors involves significant time and expense.

There is, therefore, a need for a disk drive capable of implementing data path protection without requiring the significant modifications required to increase the size of the data sectors.

SUMMARY OF THE INVENTION

An embodiment of the present invention comprises a disk drive including a disk having a plurality of data tracks, wherein each data track comprises a plurality of data sectors. The disk drive further comprises a buffer memory, and control circuitry operable to receive a write command from a host, wherein the write command comprises write data and a write data address. Write EDC data is generated in response to the write data and the write data address, wherein the write data and the write EDC data are stored in the buffer memory. The write data is read from the buffer memory and write check data is generated in response to the write data and the write data address. The write EDC data is read from the buffer memory and compared to the write check data to detect a write error. If the write error is not detected, the write data is written to the disk without writing the write EDC data to the disk.

In one embodiment, the write data address comprises an absolute block address, and in an alternative embodiment, the write data address comprises a logical block address.

In another embodiment, a read command is received from the host, wherein data is read from at least one of the data sectors in response to a read data address associated with the read command. Error detection code (EDC) data is generated in response to the read data and the data address, and the data and the EDC data are stored in the buffer memory. The read data is then read from the buffer memory, and read check data is generated in response to the read data and the read data address. The EDC data is read from the buffer memory and compared to the read check data to detect a read error. In one embodiment, the read data is transmitted from the buffer memory to the host if the read error is not detected.

Another embodiment of the present invention comprises a disk drive including a disk having a plurality of data tracks, wherein each data track comprises a plurality of data sectors. The disk drive further comprises a buffer memory, and control circuitry operable to receive a write command from a host, wherein the write command comprises write data and host generated error detection code (EDC) data generated in response to the write data. The write data is written to the disk without writing the host generated EDC data to the disk.

In one embodiment, the write command further comprises a write data address identifying at least one of the data sectors for storing the write data, and the host generated EDC data is further generated in response to the write data address. In one embodiment, the write data address comprises a logical block address.

In another embodiment, the write data and the host generated EDC data are stored in the buffer memory. The write data is then read from the buffer memory and write check data is generated in response to the write data and the write data address. The host generated EDC data is read from the buffer memory and compared to the write check data to detect a write error. In one embodiment, an error signal is transmitted to the host if the write error is detected, and in one embodiment, the write data is not written to the disk if the write error is detected.

In yet another embodiment, a read command is received from the host, data is read from the disk in response to the read command, EDC data is generated in response to the read data, and the read data and the EDC data are transmitted to the host. In one embodiment, the read data and the EDC data are stored in the buffer memory. The read data is then read from the buffer memory and read check data is generated in response to the read data. The EDC data is read from the buffer memory and compared to the read check data to detect a read error. In one embodiment, the read command further comprises a read data address identifying at least one of the data sectors for storing the read data, and the read check data is further generated in response to the read data address. In one embodiment, the read data address comprises a logical block address. In another embodiment, an error signal is transmitted to the host if the read error is detected.

Another embodiment of the present invention comprises a method of operating a disk drive, the disk drive comprising a disk and a buffer memory. The disk comprises a plurality of data tracks, wherein each data track comprises a plurality of data sectors. A write command is received from a host, wherein the write command comprises write data and a write data address. Write EDC data is generated in response to the write data and the write data address, wherein the write data and the write EDC data are stored in the buffer memory. The write data is read from the buffer memory, and write check data is generated in response to the write data and the write data address. The write EDC data is read from the buffer memory and compared to the write check data to detect a write error. If the write error is not detected, the write data is written to the disk without writing the write EDC data to the disk.

Another embodiment of the present invention comprises a method of operating a disk drive, the disk drive comprising a disk and a buffer memory. The disk comprises a plurality of data tracks, wherein each data track comprises a plurality of data sectors. A write command is received from a host, wherein the write command comprises write data and host generated error detection code (EDC) data generated in response to the write data. The write data is written to the disk without writing the host generated EDC data to the disk.

DESCRIPTION OF THE PREFERRED EMBODIMENTS

Figure 1:
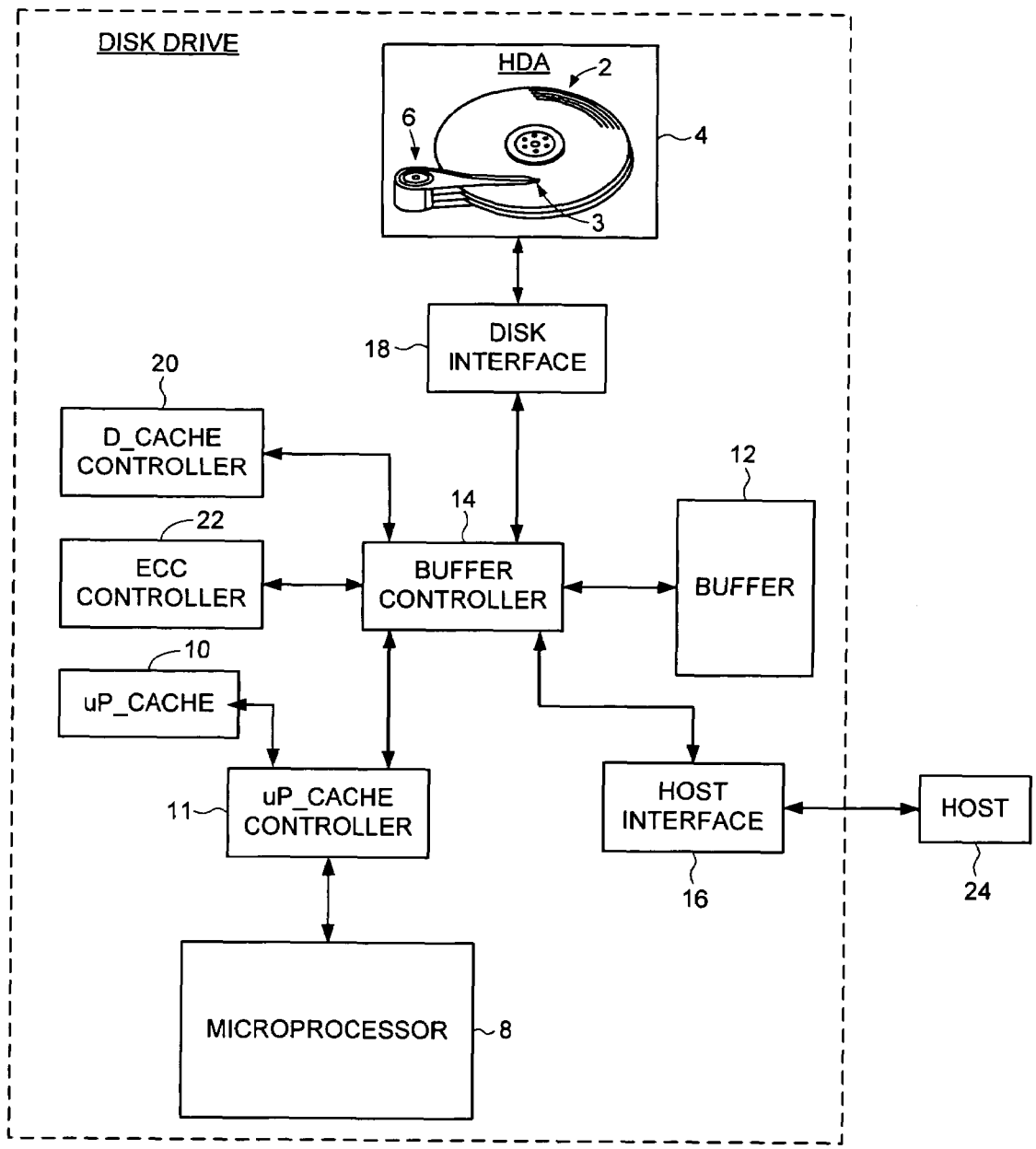
FIG. 1 shows a prior art disk drive comprising a number of components, including a microprocessor for executing a control program, and a buffer memory for staging data to be written to the disk and data read from the disk.
Figure 2:
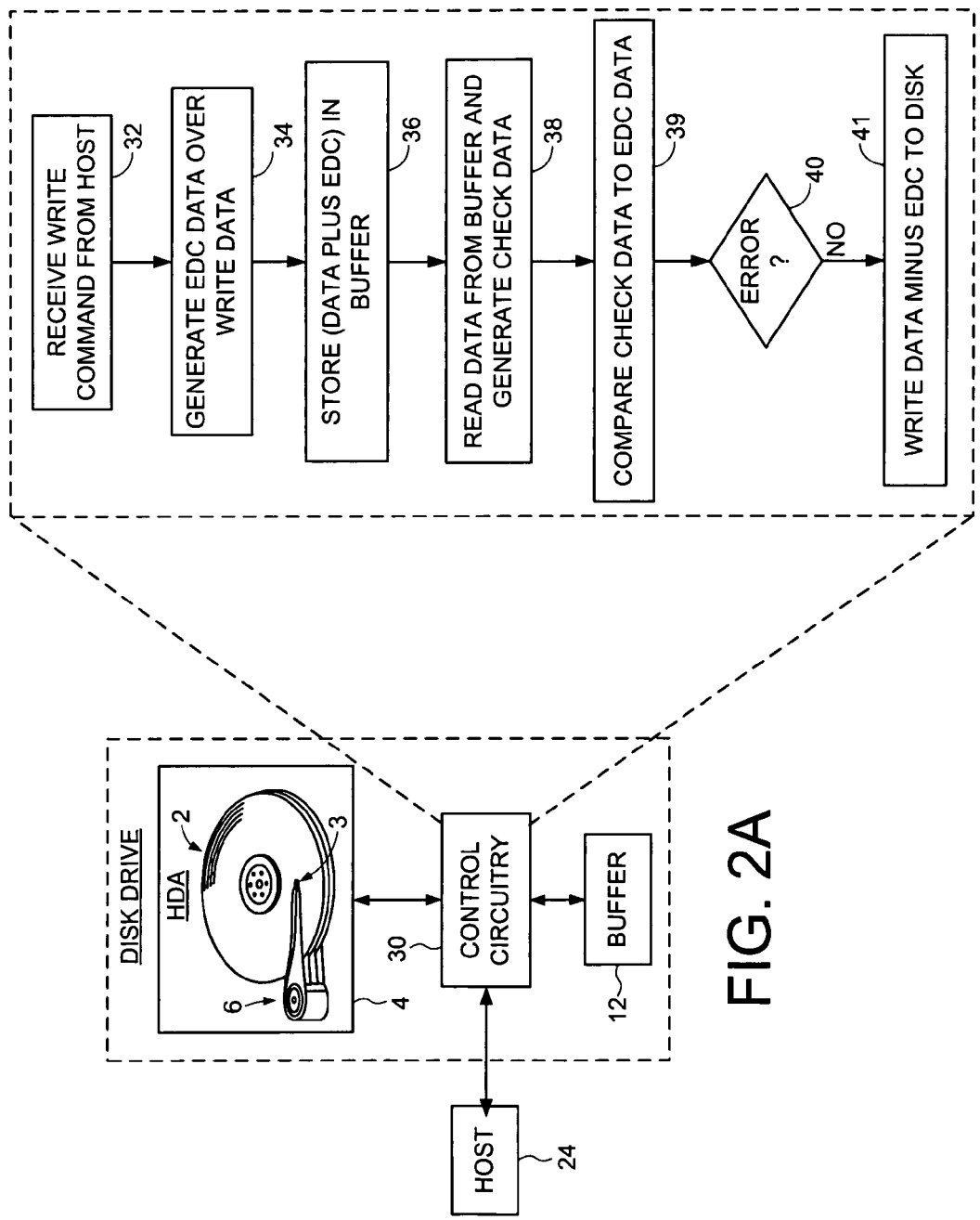
FIG. 2A shows a disk drive according to an embodiment of the present invention comprising a buffer memory for staging data, and control circuitry for implementing data path protection without writing EDC data to the disk.
FIG. 2B is a flow diagram executed by the control circuitry for receiving a write command from a host, and generating EDC data used to protect the write data while staged in the buffer memory.

FIG. 2A shows a disk drive according to an embodiment of the present invention including a disk 2 having a plurality of data tracks, wherein each data track comprises a plurality of data sectors. The disk drive further comprises a buffer memory 12, and control circuitry 30 operable to execute the flow diagram of FIG. 2B wherein at step 32 a write command is received from a host 24, the write command comprising write data and a write data address. At step 34, write error detection code (EDC) data is generated in response to the write data and the write data address, wherein the write data and the write EDC data are stored in the buffer memory 12 at step 36. At step 38, the write data is read from the buffer memory 12, and write check data is generated in response to the write data and the write data address. At step 39, the write EDC data is read from the buffer memory 12 and compared to the write check data to detect a write error. If the write error is not detected at step 40, at step 41 the write data is written to the disk 2 without writing the write EDC data to the disk 2.

Since the write EDC data is not written to the disk 2, the size of the data sectors does not need to be increased, thereby avoiding the associated complexity and expense. The write EDC data protects the write data while it is staged in the buffer memory 12 waiting to be written to the disk 2. For example, the write EDC data protects against a programming error that inadvertently causes the write data staged in the buffer memory 12 to be overwritten.

Any suitable write data address may be associated with the write command. In one embodiment, the write data address comprises an absolute block address (ABA), and in an alternative embodiment, the write data address comprises a logical block address (LBA). In one embodiment, an LBA is mapped to an ABA to facilitate the mapping of defective data sectors to spare data sectors. In one embodiment, the write EDC data is generated over the write data and the LBA, and in an alternative embodiment the write EDC data is generated over the write data and the ABA after mapping the LBA to the ABA. In either embodiment, the write EDC data may be said to be generated in response to the write data address received from the host.

In another embodiment, a read command is received from the host 24, and data is read from at least one of the data sectors in response to a data address associated with the read command. EDC data is generated in response to the data and the data address, and the data and the EDC data are stored in the buffer memory 12. The data is then read from the buffer memory 12, and check data is generated in response to the data and the data address. The EDC data is read from the buffer memory 12 and compared to the check data to detect a read error. In one embodiment, the data read from the buffer memory 12 is transmitted to the host 24 if the read error is not detected.

Figure 3:
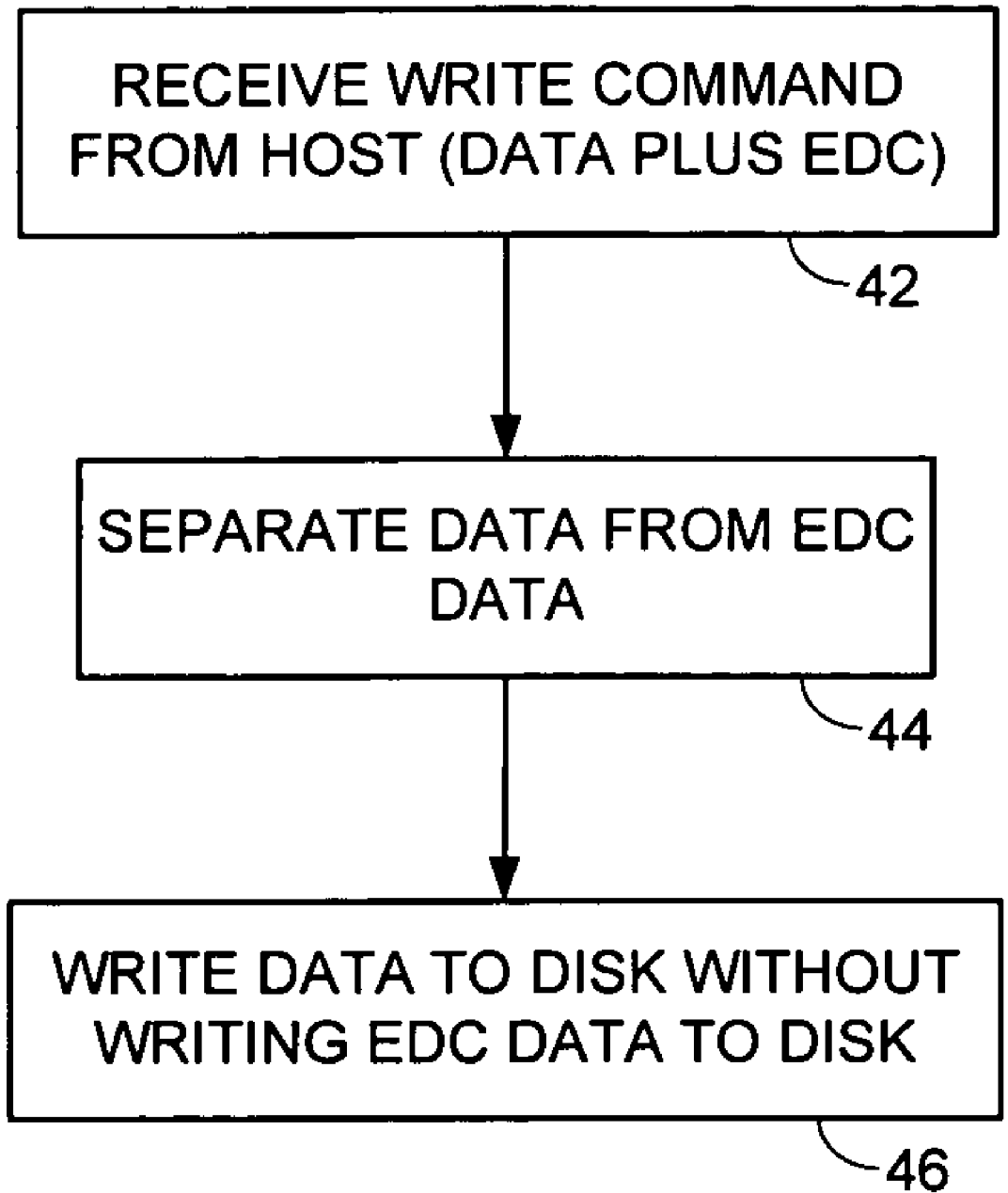
FIG. 3 is a flow diagram executed by the control circuitry for receiving a write command from a host including write data and EDC data, wherein the EDC data is not written to the disk.

FIG. 3 is a flow diagram executed by the control circuitry 30 according to another embodiment of the present invention wherein the host 24 generates the EDC data for protecting the write data. The host 24 transmits both the write data and host generated EDC data to the disk drive, wherein the disk drive uses the host generated EDC data to protect the write data while staged in the buffer memory 12, but does not write the host generated EDC data to the disk 2. At step 42, a write command is received from the host 24, wherein the write command comprises write data and host generated error detection code (EDC) data generated in response to the write data. At step 44 the host generated EDC data is separated from the write data, and at step 46 the write data is written to the disk 2 without writing the host generated EDC data to the disk 2. In one embodiment, the write command further comprises a write data address identifying at least one of the data sectors for storing the write data, and the host generated EDC data is further generated in response to the write data address. For example, in one embodiment the write data address comprises a logical block address (LBA).

Figure 4A:
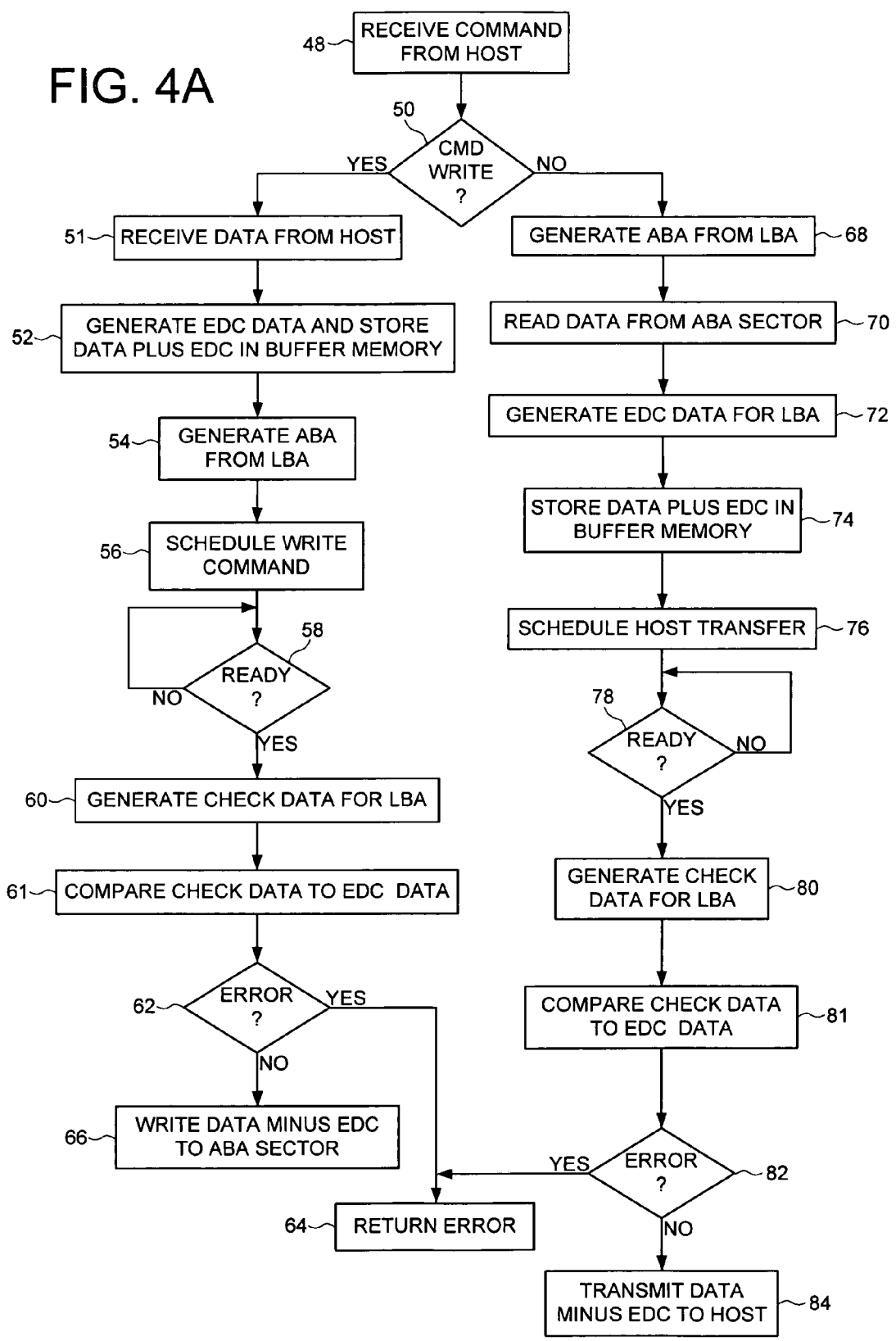
FIG. 4A is a more detailed diagram according to an embodiment of the present invention wherein the disk drive generates the EDC data used to protect the read/write data staged in the buffer memory.

FIG. 4A is a more detailed diagram according to an embodiment of the present invention wherein the disk drive generates the EDC data used to protect the read/write data staged in the buffer memory 12. At step 48, the disk drive receives a command from the host 24, and if at step 50 the command is a write command, then at step 51 write data is received from the host. At step 52 the control circuitry 30 generates write EDC data over the write data and data address (LBA) received from the host 24, and stores the write data and the appended write EDC data in the buffer memory 12. At step 54 an ABA is generated from the LBA received from the host 24, and at step 56 the write command is scheduled (e.g., using a rotational position optimization (RPO) algorithm). When the control circuitry 30 is ready to execute the write command at step 58, at step 60 the write data is read from the buffer memory 12, and check data is generated over the write data and the corresponding LBA. At step 61, the write EDC data is read from the buffer memory 12 and compared to the check data to detect an error. If an error is detected at step 62, then at step 64 an error signal is returned to the host 24. Alternatively, if the error is detected, the disk drive may attempt an error recovery routine before returning an error signal to the host. Otherwise, if no error is detected at step 62, at step 66 the write data is written to the disk 2 (to the data sector(s) corresponding to the ABA) without writing the write EDC data to the disk 2.

If at step 50 the command received from the host 24 is a read command, then at step 68 an ABA is generated from the LBA received from the host 24, and at step 70 the data is read from the corresponding data sector(s). At step 72, EDC data is generated over the data read from the disk 2 and the LBA, and at step 74 the data and appended EDC data are stored in the buffer memory 12. At step 76, the host transfer is scheduled, and when the control circuitry 30 is ready to transmit the data to the host 24 at step 78, at step 80 the data is read from the buffer memory 12, and check data is generated over the data and the corresponding LBA. At step 81, the EDC data is read from the buffer memory 12 and compared to the check data to detect a read error. If a read error is detected at step 82, then at step 64 an error signal is returned to the host 24. Alternatively, if the read error is detected, the disk drive may attempt an error recovery routine before returning an error signal to the host. Otherwise, if no error is detected at step 82, at step 84 the data is transmitted to the host 24 without transmitting the EDC data to the host 24.

Figure 4B:
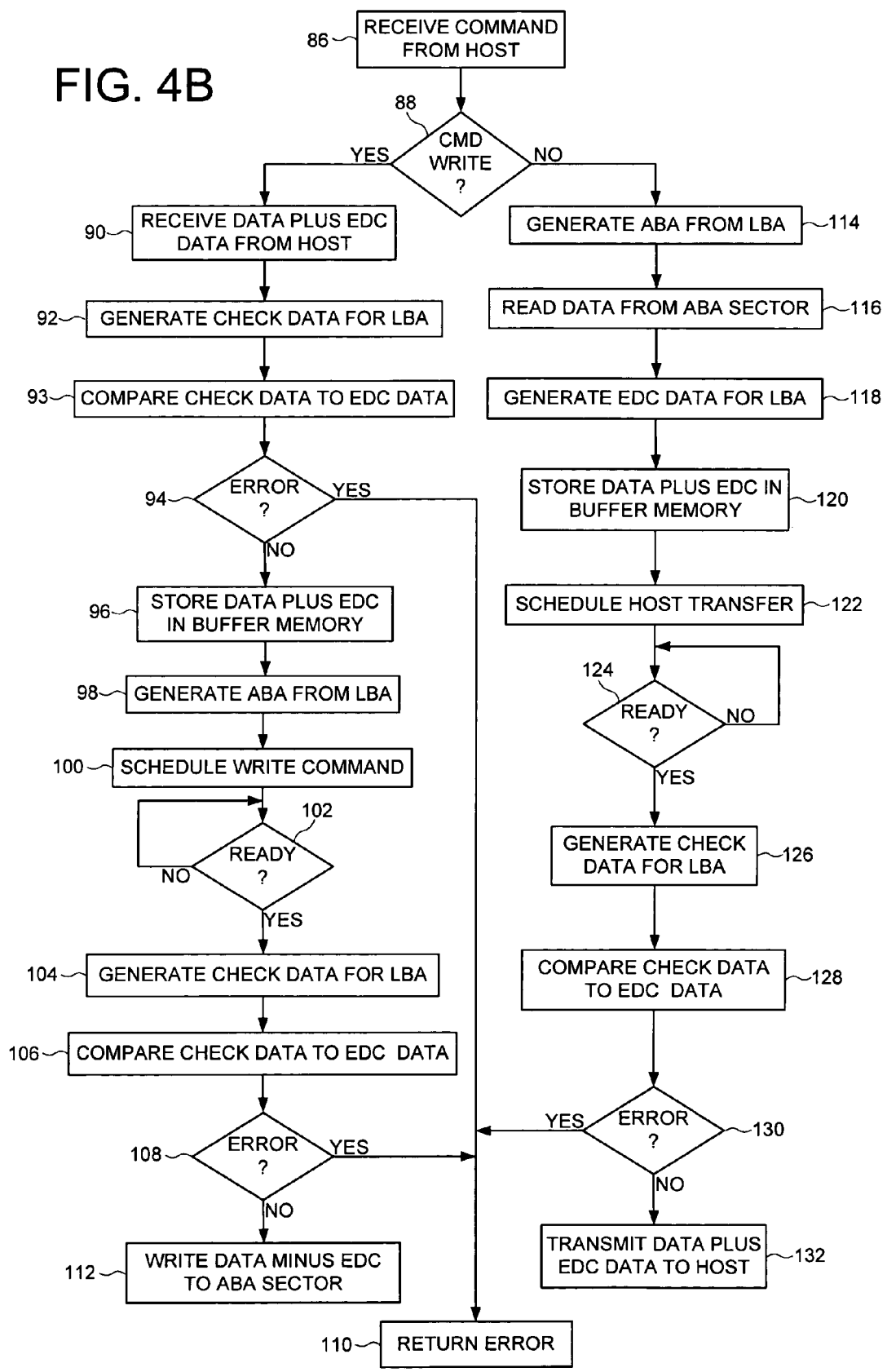
FIG. 4B is a flow diagram according to an embodiment of the present invention wherein the host generates the EDC data used to protect the read/write data staged in the buffer memory.

FIG. 4B is a more detailed diagram according to an embodiment of the present invention wherein the host 24 generates the EDC data used to protect the read/write data staged in the buffer memory 12. At step 86, the disk drive receives a command from the host 24, and if at step 88 the command is a write command, then at step 90 the control circuitry 30 receives write data with appended EDC data generated by the host 24. At step 92, the control circuitry 30 generates check data over the write data and corresponding LBA, and at step 93 the check data is compared to the host generated EDC data to detect a write error. If a write error is detected at step 94, then at step 110 an error signal is returned to the host 24, and the control circuitry 30 does not write the write data to the disk 2.

If a write error is not detected at step 94, then at step 96 the control circuitry 30 stores in the buffer memory 12 the write data and the host generated EDC data received from the host 24. At step 98 an ABA is generated from the LBA received from the host 24, and at step 100 the write command is scheduled (e.g., using a rotational position optimization (RPO) algorithm). When the control circuitry 30 is ready to execute the write command at step 102, at step 104 the write data is read from the buffer memory 12, and check data is generated over the write data and the corresponding LBA. At step 106, the host generated EDC data is read from the buffer memory 12 and compared to the check data to detect an error. If an error is detected at step 108, then at step 110 an error signal is returned to the host 24, and the control circuitry 30 does not write the write data to the disk 2. Otherwise, at step 112 the write data is written to the disk 2 (to the data sector(s) corresponding to the ABA) without writing the host generated EDC data to the disk 2.

If at step 88 the command received from the host 24 is a read command, then at step 114 an ABA is generated from the LBA received from the host 24, and at step 116 the data is read from the corresponding data sector(s). At step 118, EDC data is generated by the control circuitry 30 over the data read from the disk 2 and the LBA, and at step 120, the data and appended EDC data are stored in the buffer memory 12. At step 122, the host transfer is scheduled, and when the control circuitry 30 is ready to transmit the data to the host 24 at step 124, at step 126 the data is read from the buffer memory 12, and check data is generated over the data and the corresponding LBA. At step 128, the EDC data is read from the buffer memory 12 and compared to the check data to detect a read error. If a read error is detected at step 130, then at step 110 an error signal is returned to the host 24. Otherwise, at step 132 the data and appended EDC data are transmitted to the host 24 so that the validity of the data can be verified when received by the host 24, thereby implementing end-to-end data path protection.

Figure 5:
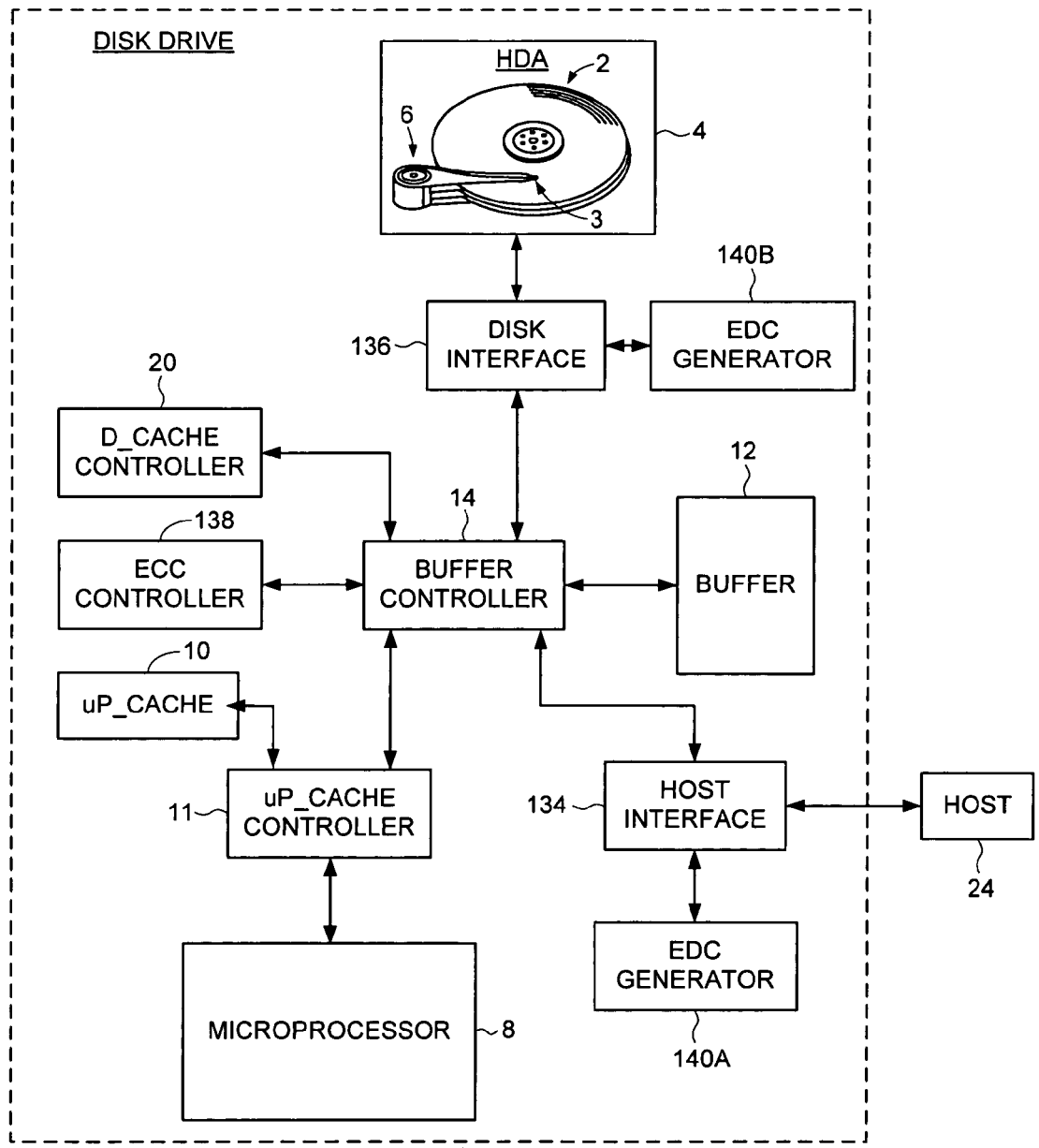
FIG. 5 is a disk drive according to an embodiment of the present invention comprising a number of components, including a microprocessor for executing a control program, a buffer memory for staging data, a host interface for interfacing with a host, a disk interface for interfacing with the disk, and an EDC generator for generating EDC data and check data to protect read/write data while staged in the buffer memory.

FIG. 5 shows a disk drive according to an embodiment of the present invention wherein the control circuitry 30 of FIG. 2A comprises a number of components, including a microprocessor (uP) 8 for executing code segments of a control program. The microprocessor 8 typically accesses a fast uP cache 10 (e.g., an SRAM) through a uP cache controller 11 which caches op codes being executed as well as program data. The code segments of the control program are typically stored on the disk 2 and loaded into the buffer memory 12 (e.g., an SDRAM) when the disk drive is powered on. As the microprocessor 8 executes the control program, the uP cache controller 11 transfers a burst of corresponding op codes from the external buffer memory 12 into the uP cache 10 for fast access by the microprocessor 8. Since the buffer memory 12 is typically shared with other control components, a buffer controller 14 implements an arbitration algorithm to arbitrate access to the buffer memory 12. Example control components that may share access to the buffer memory 12 include a host interface 134, a disk interface 136, a data cache controller 20, and an ECC controller 138, one or more of which may be integrated with the microprocessor 8 in a system on a chip (SOC), or implemented as separate integrated circuits.

Of course, any suitable control circuitry 30 may be employed in the embodiments of the present invention. In one embodiment, the control circuitry 30 comprises the microprocessor 8 executing instructions, the instructions being operable to cause the microprocessor 8 to perform the steps described above with respect to FIGS. 2-4, as well as other functions described herein. The instructions may be stored in any computer-readable medium. In one embodiment, they may be stored on a non-volatile semiconductor memory external to the microprocessor (not shown), or integrated with the microprocessor in a SOC. In another embodiment, the instructions are stored on the disk 2 and read into a volatile semiconductor memory when the disk drive is powered on. In yet another embodiment, the control circuitry 30 comprises suitable logic circuitry, such as state machine circuitry.

The host interface 134 facilitates data transfer between the disk drive and the host 24 during read and write operations. During a write operation, the host interface 134 stages the write data received from the host in the buffer memory 12 before it is written to the disk 2. In the embodiment wherein the host 24 implements data path protection, the host interface 134 may generate check data over the write data received from the host and the corresponding LBA using an EDC generator 140A to verify the write data is received from the host 24 error free. In the embodiment wherein the disk drive generates the EDC data, the host interface 134 may generate the write EDC data over the write data and the LBA received from the host using the EDC generator 140A. The EDC generator 140A may comprise any suitable circuitry, such as a suitable generator polynomial, for generating any suitable EDC data, such as cyclical redundancy check (CRC) data. The host interface 134 stores the write EDC data (whether generated internally by the control circuitry 30 or received from the host 24) with the write data in the buffer memory 12. The microprocessor 8 typically executes a scheduling algorithm (e.g., an RPO algorithm) for executing the write command at an appropriate time, for example, when the head 3 is near the target data sectors corresponding to the write command.

The disk interface 136 performs the actual interface functions with the HDA 4 in order to write the data stored in the buffer memory 12 to the disk 2. When executing the write command, the disk interface 136 reads the write data from the buffer memory 12 and may use an EDC generator 140B to generate check data over the write data and the corresponding LBA. The disk interface 136 then compares the write EDC data stored in the buffer memory 12 to the check data to detect an error. If an error is not detected, the disk interface 136 executes the write operation by writing the write data to the target data sectors on the disk 2 without writing the write EDC data to the disk 2.

During a read operation, the disk interface 136 reads the data from the data sectors identified by the LBA received from the host 24. The disk interface 136 generates EDC data over the read data and the LBA, and stores the data and the EDC data in the buffer memory 12. When the host interface 134 is ready to transfer the data to the host 24, the host interface 134 reads the data from the buffer memory 12 and generates check data over the data and the corresponding LBA using the EDC generator 140A. The host interface 134 compares the EDC data stored in the buffer memory 12 to the check data to detect an error. If an error is not detected, the host interface 134 transmits the data to the host 24, and if the host 24 implements data path protection, the host interface 134 also transmits the EDC data to the host 24.

The ECC controller 138 implements a suitable error correction algorithm on data read from the disk 2 and staged in the buffer memory 12. In one embodiment, the disk interface 136 waits until the ECC controller 138 is finished correcting the data staged in the buffer memory 12 before generating the EDC data over the data and LBA. In this manner, the EDC data is generated during a read operation over the corrected data sectors. In an alternative embodiment, the disk interface 136 generates the EDC data as the data is read from the disk 2 and stores the EDC data in the buffer memory 12. If the ECC controller 138 makes a subsequent correction to the data in the buffer memory 12 (e.g., using a software ECC algorithm), the ECC controller 138 updates the corresponding EDC data using any suitable technique. For example, the correction symbols generated by the ECC controller 138 can be used to update the EDC data to reflect the corrections made to the data staged in the buffer memory 12.

I claim:

1. A disk drive comprising:
   (a) a disk comprising a plurality of data tracks, wherein each data track comprises a plurality of data sectors;
   (b) a buffer memory; and
   (c) control circuitry operable to:
       receive a write command from a host, wherein the write command comprises write data and a write data address;
       generate write error detection code (EDC) data in response to the write data and the write data address;
       store the write data and the write EDC data in the buffer memory;
       read the write data from the buffer memory and generate write check data in response to the write data and the write data address;
       read the write EDC data from the buffer memory and compare the write EDC data to the write check data to detect a write error; and
       if the write error is not detected, write the write data to the disk without writing the write EDC data to the disk.

2. The disk drive as recited in claim 1, wherein the write data address comprises an absolute block address.

3. The disk drive as recited in claim 1, wherein the write data address comprises a logical block address.

4. The disk drive as recited in claim 1, wherein the control circuitry is further operable to:
   receive a read command from the host;
   read data from at least one of the data sectors in response to a read data address associated with the read command;
   generate read EDC data in response to the read data and the read data address;
   store the read data and the read EDC data in the buffer memory;

read the read data from the buffer memory and generate read check data in response to the read data and the read data address; and read the read EDC data from the buffer memory and compare the read EDC data to the read check data to detect a read error.

5. The disk drive as recited in claim 4, wherein the control circuitry is further operable to transmit the read data from the buffer memory to the host if the read error is not detected.

6. A disk drive comprising:
   (a) a disk comprising a plurality of data tracks, wherein each data track comprises a plurality of data sectors;
   (b) a buffer memory; and
   (c) control circuitry operable to:
      receive a write command from a host, wherein the write command comprises write data and host generated error detection code (EDC) data generated in response to the write data; and
      write the write data to the disk without writing the host generated EDC data to the disk.

7. The disk drive as recited in claim 6, wherein:
   (a) the write command further comprises a write data address identifying at least one of the data sectors for storing the write data; and
   (b) the host generated EDC data is further generated in response to the write data address.

8. The disk drive as recited in claim 7, wherein the control circuitry is further operable to:
   store the write data and the host generated EDC data in the buffer memory;
   read the write data from the buffer memory and generate write check data in response to the write data and the write data address; and
   read the host generated EDC data from the buffer memory and compare the host generated EDC data to the write check data to detect a write error.

9. The disk drive as recited in claim 6, wherein the control circuitry is further operable to:
   receive a read command from the host;
   read data from the disk in response to the read command;
   generate EDC data in response to the read data; and
   transmit the read data and the control circuitry generated EDC data to the host.

10. The disk drive as recited in claim 9, wherein the control circuitry is further operable to:
    store the read data and the control circuitry generated EDC data in the buffer memory;
    read the read data from the buffer memory and generate read check data in response to the read data; and
    read the control circuitry generated EDC data from the buffer memory and compare the control circuitry generated EDC data to the read check data to detect a read error.

11. The disk drive as recited in claim 10, wherein:
    (a) the read command further comprises a read data address identifying at least one of the data sectors for storing the read data; and
    (b) the read check data is further generated in response to the read data address.

12. A method of operating a disk drive, the disk drive comprising a disk comprising a plurality of data tracks, wherein each data track comprises a plurality of data sectors, and a buffer memory, the method comprising the steps of:
    receiving a write command from a host, wherein the write command comprises write data and a write data address;
    generating write error detection code (EDC) data in response to the write data and the write data address;
    storing the write data and the write EDC data in the buffer memory;
    reading the write data from the buffer memory and generating write check data in response to the write data and the write data address;
    reading the write EDC data from the buffer memory and comparing the write EDC data to the write check data to detect a write error; and
    if the write error is not detected, writing the write data to the disk without writing the write EDC data to the disk.

13. The method as recited in claim 12, wherein the write data address comprises an absolute block address.

14. The method as recited in claim 12, wherein the write data address comprises a logical block address.

15. The method as recited in claim 12, further comprising the steps of:
    receiving a read command from the host;
    reading data from at least one of the data sectors in response to a read data address associated with the read command;
    generating EDC data in response to the read data and the read data address;
    storing the read data and the EDC data in the buffer memory;
    reading the read data from the buffer memory and generating read check data in response to the read data and the read data address; and
    reading the EDC data from the buffer memory and comparing the EDC data to the read check data to detect a read error.

16. The method as recited in claim 15, further comprising the step of transmitting the read data from the buffer memory to the host if the read error is not detected.

17. A method of operating a disk drive, the disk drive comprising a disk comprising a plurality of data tracks, wherein each data track comprises a plurality of data sectors, and a buffer memory, the method comprising the steps of:
    receiving a write command from a host, wherein the write command comprises write data and host generated error detection code (EDC) data generated in response to the write data; and
    writing the write data to the disk without writing the host generated EDC data to the disk.

18. The method as recited in claim 17, wherein:
    the write command further comprises a write data address identifying at least one of the data sectors for storing the write data; and
    the host generated EDC data is further generated in response to the write data address.

19. The method as recited in claim 18, further comprising the steps of:
    storing the write data and the host generated EDC data in the buffer memory;
    reading the write data from the buffer memory and generating write check data in response to the write data and the write data address; and
    reading the host generated EDC data from the buffer memory and comparing the host generated EDC data to the write check data to detect a write error.

20. The method as recited in claim 17, further comprising the steps of:
    receiving a read command from the host;
    reading data from the disk in response to the read command;
    generating EDC data in response to the read data; and
    transmitting the read data and the EDC data to the host.

21. The method as recited in claim 20, further comprising the steps of:
- storing the data and the EDC data in the buffer memory;
- reading the read data from the buffer memory and generating read check data in response to the read data; and
- reading the EDC data from the buffer memory and comparing the EDC data to the read check data to detect a read error.

22. The method as recited in claim 21, wherein:
- the read command further comprises a read data address identifying at least one of the data sectors for storing the read data; and
- the read check data is further generated in response to the read data address.

* * * * *